United States Patent [19]

Kitagishi et al.

[11] 4,348,084
[45] Sep. 7, 1982

[54] TELE-PHOTOGRAPHIC LENS OF LARGE APERTURE RATIO

[75] Inventors: Nozomu Kitagishi, Kawasaki; Kazuo Fujibayashi, Yokohama, both of Japan

[73] Assignee: Canon Kabushiki Kaisha, Tokyo, Japan

[21] Appl. No.: 144,989

[22] Filed: Apr. 30, 1980

[30] Foreign Application Priority Data

May 7, 1979 [JP] Japan .................. 54-55474

[51] Int. Cl.³ .................. G02G 9/62; G02B 13/02
[52] U.S. Cl. .................. 350/454
[58] Field of Search .................. 350/454, 456

[56] References Cited

U.S. PATENT DOCUMENTS 4,240,703  12/1980  Momiyama .................. 350/456 X

Primary Examiner—Vincent P. McGraw
Attorney, Agent, or Firm—Toren, McGeady & Stanger

[57] ABSTRACT

A tele-photographic lens of a small F-number comprising a positive first lens group, a negative second lens group, a negative third lens group and a positive fourth lens group. Focusing is carried out by moving the third lens group in the direction of the optical axis. Assuming that the compound focal length of the first, second and third lens groups is f(I, II, III), and the focal length of the whole system is fT, the lens satisfies the condition of $2\,fT < f(I, II, III) < 2.6\,fT$ for correction of aberrations with the lens in a state of being focused on an object located at infinity.

11 Claims, 28 Drawing Figures

SPHERICAL ABERRATION

ASTIGMATISM ABERRATION

DISTORTION ABERRATION

SINE CONDITION

−.2    .2
SPHERICAL ABERRATION

−.2    .2
ASTIGMATISM ABERRATION

−2    2
DISTORTION ABERRATION

SPHERICAL
ABERRATION

ASTIGMATISM
ABERRATION

DISTORTION
ABERRATION

SPHERICAL ABERRATION

ASTIGMATISM ABERRATION

DISTORTION ABERRATION

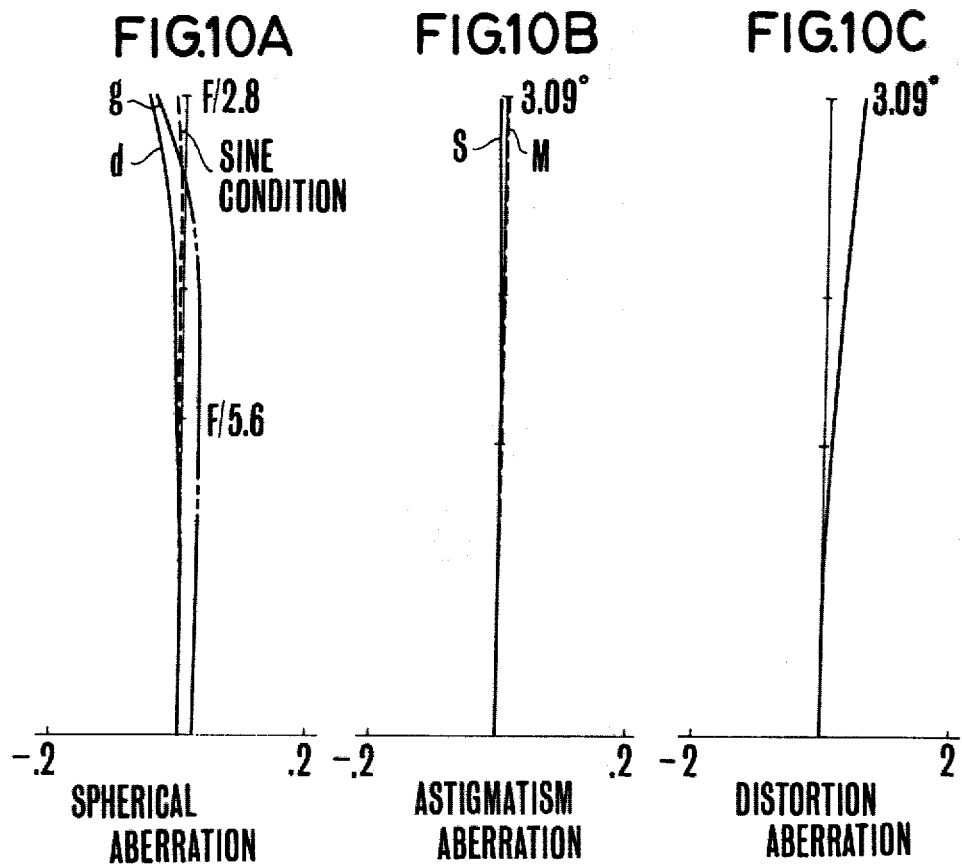

FIG.11
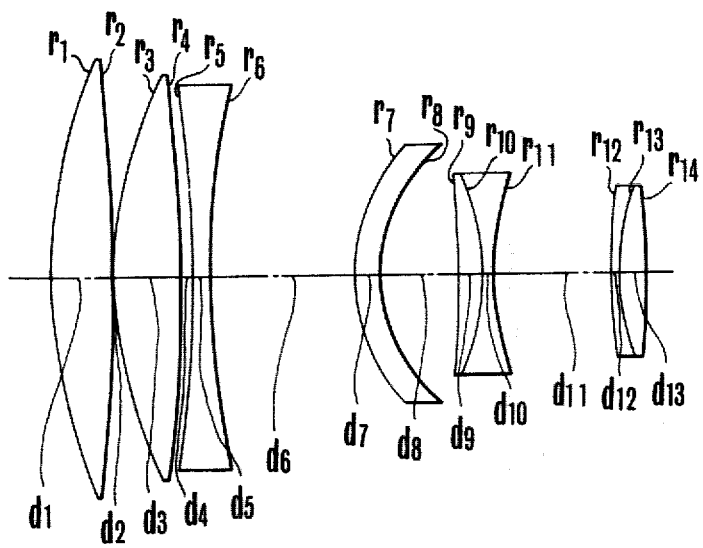
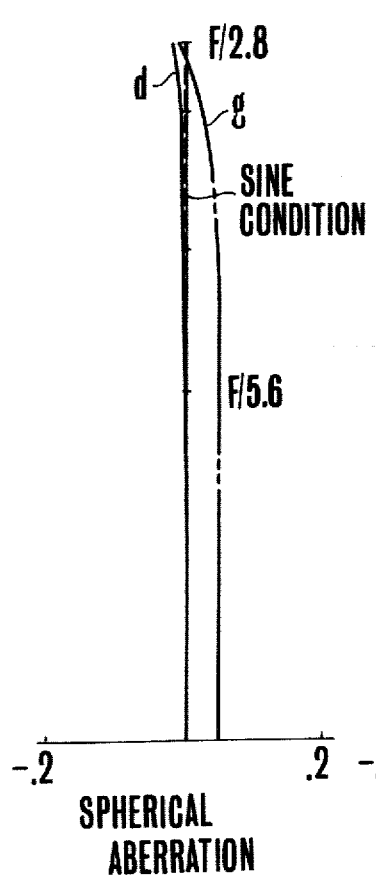
FIG.12A
SPHERICAL ABERRATION
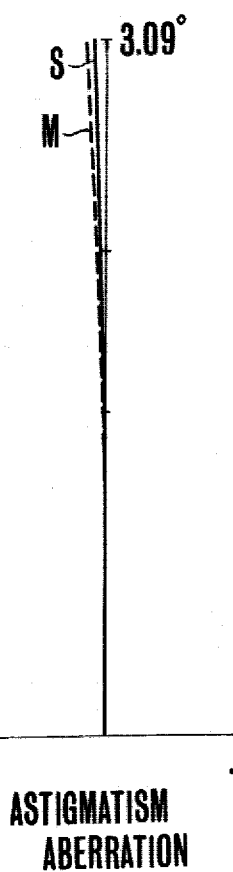
FIG.12B
ASTIGMATISM ABERRATION
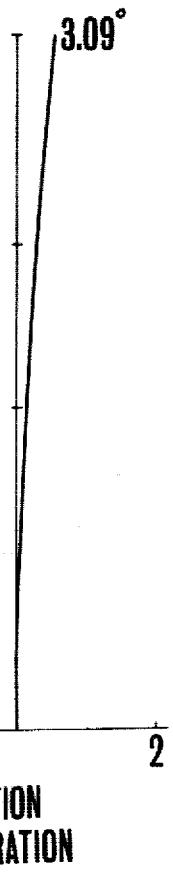
FIG.12C
DISTORTION ABERRATION

SPHERICAL ABERRATION

ASTIGMATISM ABERRATION

DISTORTION ABERRATION

TELE-PHOTOGRAPHIC LENS OF LARGE APERTURE RATIO

BACKGROUND OF THE INVENTION

1. Field of the Invention

This invention relates to a photographic lens of a large aperture ratio and of a so-called partial focus type which is arranged to perform focusing by moving a part of an optical system while keeping the total length of the optical system (length from a first lens surface to an image surface) unvaried.

2. Description of the Prior Art

Among tele-photographic lenses, the lenses of the rear focus type arranged to perform focusing by moving at least one of the lens groups disposed on the image side of the front part thereof have been known from U.S. Pat. Nos. 4,045,128 and 4,068,929. In these photographic lenses, the heavy front part of the lens system remains stationary during a focusing operation. Therefore, the center of gravity of the lens system moves to a smaller extent during focusing. Besides, since it is a light weight lens group that is to be moved, a focusing operation can be performed easily with a light touch.

When a lens group is moved for focusing, the movement of the lens group brings about changes of some aberrations. However, when the focal length of the whole lens system is arranged to be short, an aberration that is not conspicuous under a long focal length condition will increase to degrade the quality of the picture taken. Hence, a tele-photographic lens capable of correcting such degrading aberrations has been proposed in U.S. Pat. No. 4,240,703.

However, it has been a general tendency for the conventional rear focus type photographic lenses that the lens has a relatively small aperture ratio and thus has a large F number, because: a tele-photographic lens of a large aperture ratio tends to have a long total optical length and, accordingly poor operability.

SUMMARY OF THE INVENTION

It is the first object of the invention to provide a tele-photographic lens of a large aperture ratio.

It is the second object of the invention to shorten the total optical length of a tele-photographic lens.

It is the third object of the invention to correct spherical aberration, astigmatism and comatic aberration to a satisfactory degree.

It is the fourth object of the invention to hold chromatic aberration and particularly a secondary spectrum down to a minimal degree.

In accordance with the invention, a bright, high performance tele-photographic lens is obtainable by forming it with four lens groups including a positive first lens group, a negative second lens group, a negative third lens group and a positive fourth lens group; and by arranging it to permit focusing by moving the third lens group and, in an infinity focused optical configuration thereof, to satisfy the condition of $$2 fT < f(I, II, III) < 2.6 fT \tag{i}$$

wherein f(I, II, III) represents the focal length of an optical system formed by the first, second and third lens groups and fT represents the focal length of the whole system.

The first lens groups forms a so-called front group of a tele-photographic lens system while the second, third and fourth lens groups constitute a so-called rear group of a tele-photographic lens system. With this arrangement, the variation which takes place in aberrations during a focusing operation can be minimized.

Of the aberrations that are caused by the first lens group, the spherical aberration is corrected by the fixed second lens group and the astigmatism by the fixed fourth lens group to minimize the aberrations that are to be brought about by the third lens group which is a movable group.

These objects, features and advantages of the invention will become apparent from the following description of embodiments thereof taken in connection with the accompanying drawings.

BRIEF DESCRIPTION OF THE DRAWINGS

FIG. 9 is a sectional view showing a lens as Embodiment 5 of the invention.

FIGS. 10A, 10B and 10C are illustrations showing the various aberrations of the embodiment 5 when it is focused on an object located at infinity.

FIG. 11 is a sectional view showing a lens as Embodiment 6 of the invention.

FIGS. 12A, 12B and 12C are illustrations showing various aberrations of the embodiment 6 when it is focused on an object located at infinity.

DESCRIPTION OF THE PREFERRED EMBODIMENTS

Figure 1:
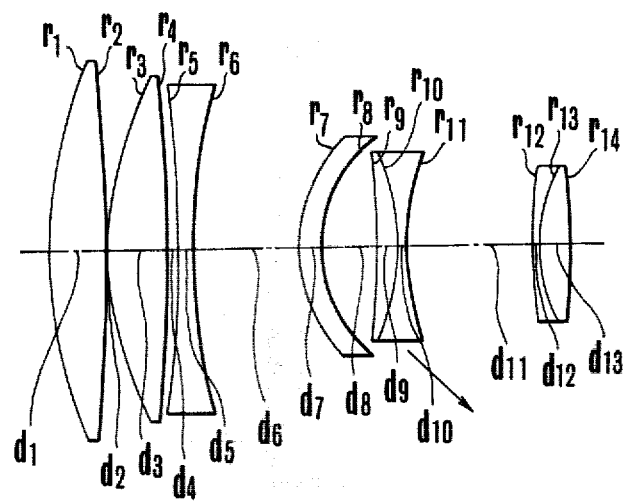
FIG. 1 is a sectional view showing a lens as Embodiment 1 of the invention.
Figure 2A:
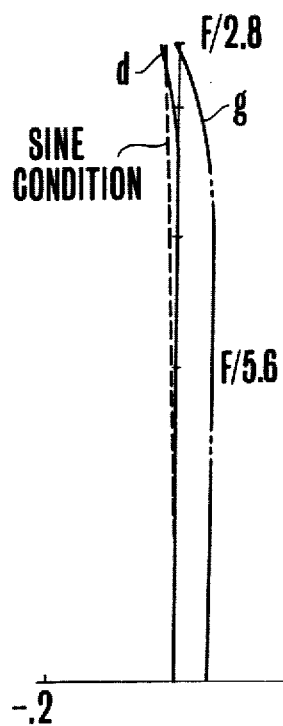
FIGS. 2A, 2B and 2C are illustrations showing various aberrations of the embodiment 1 when it is focused on an object located at infinity.
Figure 2B:
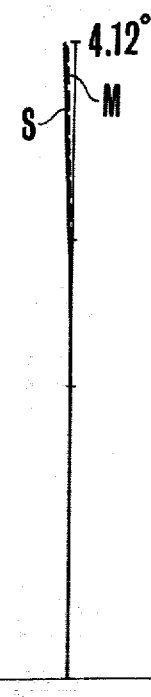
Figure 2C:
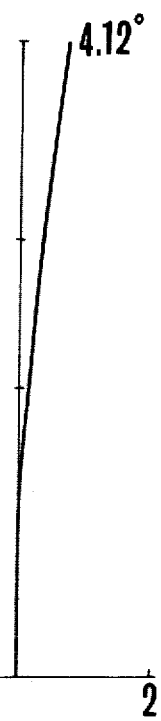
Figure 3:
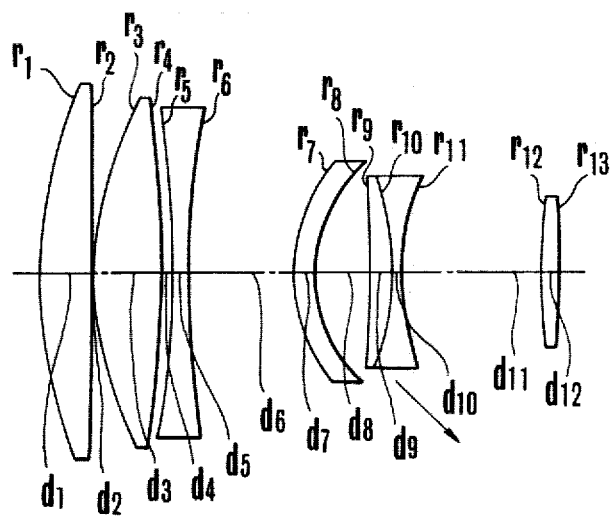
FIG. 3 is a sectional view showing a lens as Embodiment 2 of the invention.
Figure 4A:
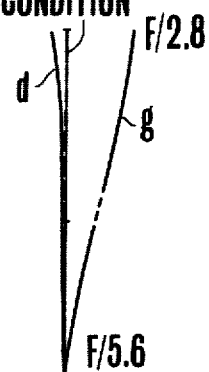
FIGS. 4A, 4B and 4C are illustrations showing the various aberrations of the embodiment 2 when it is focused on an object located at infinity.
Figure 4B:
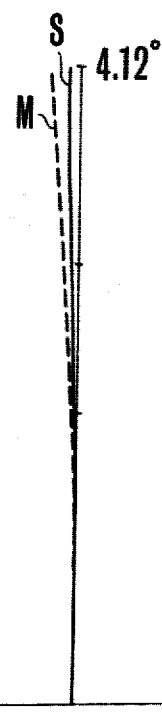
Figure 4C:
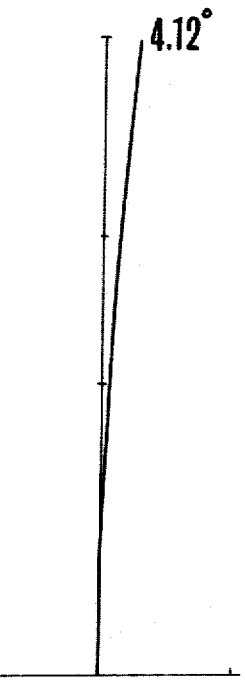
Figure 5:
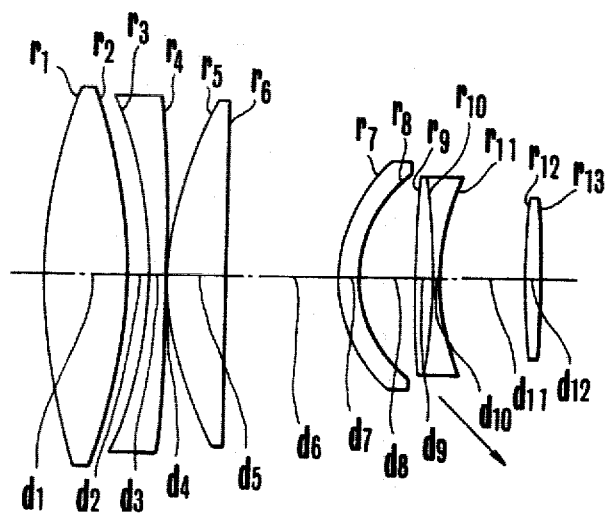
FIG. 5 is a sectional view showing a lens as Embodiment 3 of the invention.
Figure 6A:
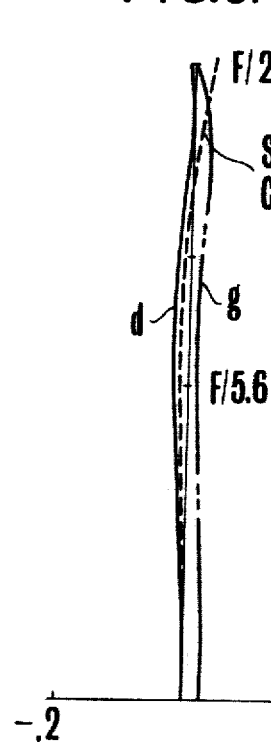
FIGS. 6A, 6B and 6C are illustrations showing the various aberrations of the embodiment 3 when it is focused on an object located at infinity.
Figure 6B:
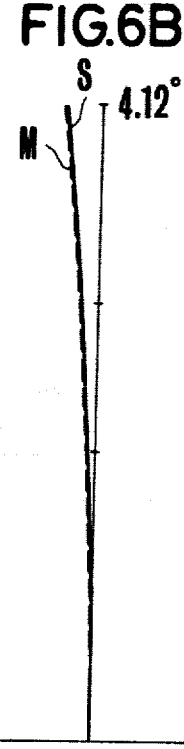
Figure 6C:
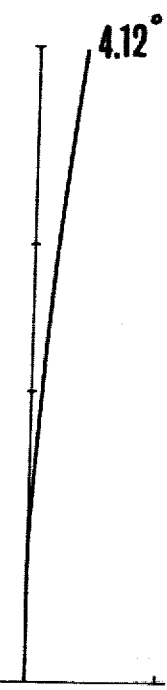
Figure 7:
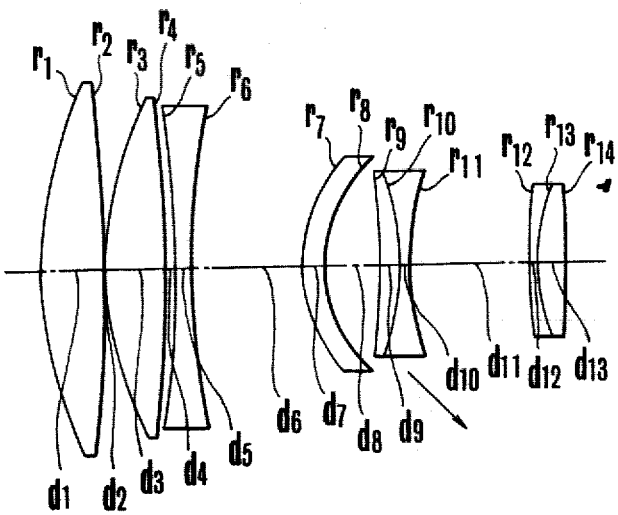
FIG. 7 is a sectional view showing a lens as Embodiment 4 of the invention.
Figure 8A:
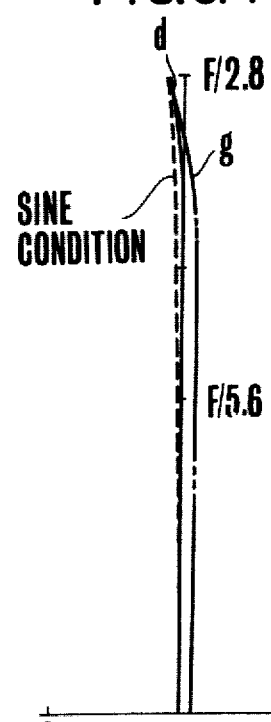
FIGS. 8A, 8B and 8C are illustrations showing various aberrations of the embodiment 4 when it is focused on an object located at infinity.
Figure 8B:
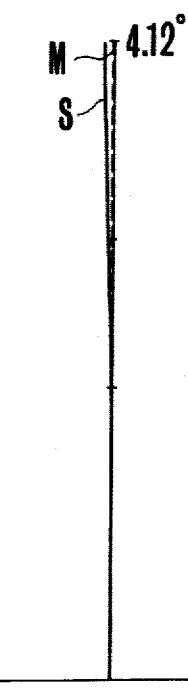
Figure 8C:
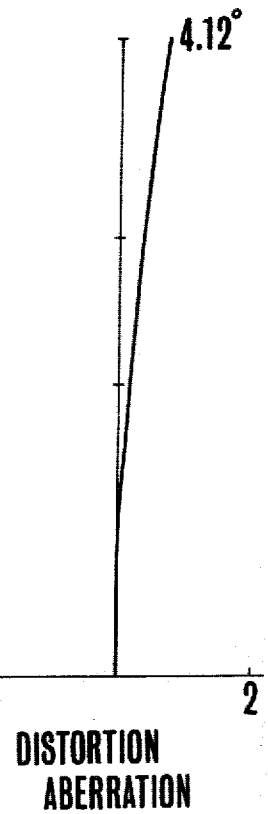
Figure 13:
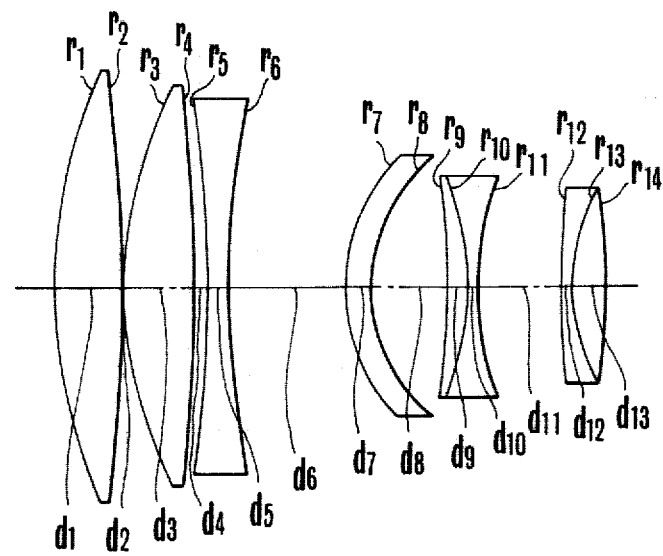
FIG. 13 is a sectional view showing a lens as Embodiment 7 of the invention.
Figure 14A:
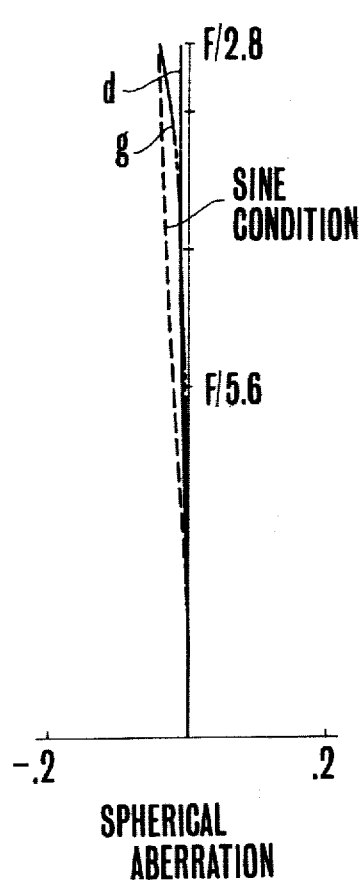
FIGS. 14A, 14B and 14C are illustrations showing the various aberrations of the embodiment 7 when it is focused on an object located at infinity.
Figure 14B:
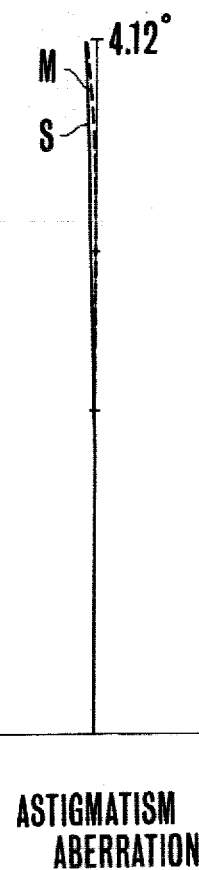
Figure 14C:
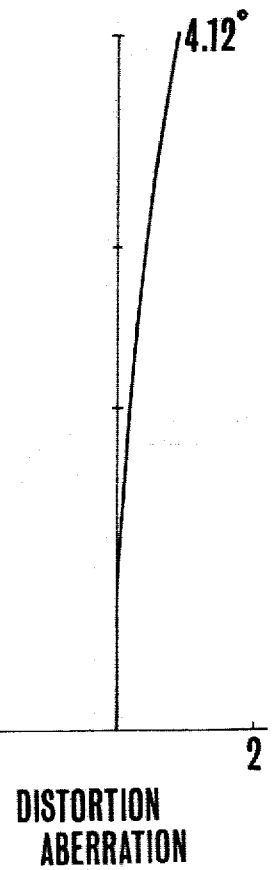

In FIGS. 1, 3, 5, 7, 9, 11 and 14, a part between lens surfaces r1 and r6 represents the first lens group; a part between lens surfaces r7 and r8 the second lens group; a part between lens surfaces r9 and r11 the third lens group; and another part between lens surfaces r12 and r14 or between lens surfaces r12 and r13 the fourth lens group. In focusing, the third lens group is moved toward an image of an object to be photographed, closer to the image side according as a distance to the object decreases. The tele-photographic lens of the invention is arranged to satisfy formula (i) given in the foregoing. The meaning of this formula and that of the limit value given thereby are as follows:

The condition represented by formula (i) is required for arrangement to shorten the total length of an optical system and yet to minimize variation that takes place in aberrations during focusing. Exceeding the lower limit causes, during a focusing operation, a great change in the diameter of a light flux passing through the third lens group and results in a greater variation of aberrations. Then, when the upper limit is exceeded, an attempt to shorten the total length of the lens makes the power of each lens group too strong for correction of aberrations.

To obtain a lens which meets the above stated condition and which has satisfactory optical characteristics, the first lens group is formed with two positive lenses and one negative lens; the second lens group is formed with a meniscus lens which has its convex surface directed to the object and has a weak power; the third lens group is formed by a cemented lens consisting of a positive lens having a convex surface on the image side and a concavo-concave lens; and the fourth lens group is formed at least with one positive lens. Then, it is necessary that the lens must satisfy each of the following conditions:

Assuming that the radius of curvature of the i-th lens surface of the whole lens system is ri, the thickness of the lens center or the spatial interval of the lens located in the i-th position in the whole system is di, the refractive index of glass of the lens located in the i-th position in the whole system is ni; and the focal length of the positive third lens group is f III, the lens must satisfy the following conditions:

$$0.35 \, fT < |f \, III| < 0.58 \, fT \text{ and } f \, III < 0 \quad \text{(ii)}$$

$$0.125 \, fT < r8 < 0.15 \, fT \quad \text{(iii)}$$

$$0.24 \, fT < r11 < 0.3 \, fT \quad \text{(iv)}$$

$$0.1/fT < (n6-n5)/r10 < 1/fT \quad \text{(v)}$$

The condition (ii) is required for minimizing the moving extent of the third lens group and variation in aberrations. If the upper limit is exceeded, the diameter of the light flux passing through the third lens group varies to a great degree during a focusing operation. This causes a great variation in aberrations. When the lower limit is exceeded, aberrations take place to a greater degree and the aberrations come to vary more conspicuously during a focusing operation.

The condition (iii) is required for having the second lens group participate in correcting the spherical aberration produced at the first lens group to minimize thereby the degree of variation of the spherical aberration which takes place according as the third lens group moves. When the upper limit given by this condition is exceeded, the degree of participation in correcting the spherical aberration decreases and this, in turn, results in an increase in the variation of the spherical aberration. If the lower limit is exceeded, there would be produced a high degree of spherical aberration and also a high degree of comatic aberration.

The conditions (iv) and (v) are required for preventing variation in aberrations during a focusing operation performed with the third lens group. The condition (iv) particularly relates to the variation of spherical aberration. When the upper limit defined by the condition (iv) is exceeded, the spherical aberration greatly varies in the direction of under correction during a focusing operation on an object located at a short distance. If the lower limit is exceeded, a high degree of spherical aberration greatly varies in the direction of over correction. On the other hand, the condition (v) relates to variations in spherical and astigmatism aberrations. When the power of the cemented face is eased, exceeding the lower limit value, the spherical and astigmatism aberrations greatly vary. When the power of the cemented face is intensified, exceeding the upper limit value, there will be produced spherical and comatic aberrations of higher degrees.

Each of Embodiments 1-3 satisfies the above stated conditions (i)-(v). In order to obtain satisfactory optical characteristics of a tele-photographic lens, it is important to hold chromatic aberration and particularly the secondary spectrum down to a minimal degree. Heretofore, the secondary spectrum has been corrected by preparing the positive and negative lenses of the so-called front group of a tele-photographic lens from a suitable combination of glass materials. In accordance with the present invention, a tele-photographic lens having very little secondary spectrum can be obtained by preparing the positive and negative lenses of the third lens group from a suitable combination of glass materials. Assuming that the Abbe numbers of the positive and negative lenses of the third lens group are $\nu5$ and $\nu6$ and the dispersion ratios of these parts are $\theta5$ and $\theta6$, the secondary spectrum can be made very small by satisfying the following conditions:

$$-0.004 < (\theta6-\theta5)/(\nu6-\nu5) < -0.003 \quad \text{(vi)}$$

Further, it is possible to obtain a high performance tele-photographic lens which has a still lesser degree of the secondary spectrum by using a suitable combination of glass materials also for the fourth lens group in cases where the fourth lens group is a cemented lens consisting of negative and positive lenses. In that case, assuming that the Abbe numbers of the negative and positive lenses of the fourth lens group are $\nu7$ and $\nu8$ and the dispersion ratios of these parts are $\theta7$ and $\theta8$, the following condition must be satisfied:

$$-0.0005 < (\theta8-\theta7)/(\nu8-\nu7) < 0.0035 \quad \text{(vii)}$$

Two embodiment examples that satisfy all of these conditions (i)-(vii) are shown as Embodiment Examples 4, 5, 6 and 7 in the following table, which shows the various elements of each embodiment (wherein $fT=100$):

| Example No. | 1 | 2 | 3 | 4 | 5 | 6 | 7 |
|---|---|---|---|---|---|---|---|
| $f_{I\,II\,III}$ | 239.23 | 218.97 | 232.48 | 231.03 | 213.11 | 259.3 | 253.6 |
| $f_{III}$ | −39.453 | −42.528 | −54.88 | −40.11 | −40.48 | −35.773 | −41.09 |
| $r_8$ | 13.769 | 14.526 | 12.986 | 13.799 | 13.767 | 13.989 | 14.231 |
| $r_{11}$ | 28.489 | 24.817 | 25.975 | 28.817 | 28.891 | 26.949 | 29.334 |
| $\dfrac{(n6-n5)}{r_{10}}$ | 0.00564 | 0.00716 | 0.00136 | 0.00773 | 0.00645 | 0.00625 | 0.00764 |

-continued

| Example No. | 1 | 2 | 3 | 4 | 5 | 6 | 7 |
|---|---|---|---|---|---|---|---|
| $\frac{(\theta_6 - \theta_5)}{(\nu_6 - \nu_5)}$ | | | | −0.00328 | −0.00325 | −0.00392 | −0.00328 |
| $\frac{(\theta_8 - \theta_7)}{(\nu_8 - \nu_7)}$ | | | | 0.000203 | −0.000407 | 0.0002 | 0.00318 | r: Radius of Curvature
nd: Refractive index of line d
d: Thickness at the center of lens or spatial interval
νd: Abbe number of line d

EMBODIMENT EXAMPLE 1

Focal Length f = 100    F number = 1:2.8
Image Angle 2ω = 8.24°

| | r | d | νd | nd |
|---|---|---|---|---|
| 1 | 46.022 | 5.613 | 81.60 | 1.49700 |
| 2 | −198.074 | 0.170 | | 1 |
| 3 | 35.074 | 5.783 | 81.60 | 1.49700 |
| 4 | −214.081 | 1.051 | | 1 |
| 5 | −147.297 | 1.700 | 32.10 | 1.67270 |
| 6 | 69.040 | 10.307 | | 1 |
| 7 | 15.878 | 2.041 | 61.10 | 1.58913 |
| 8 | 13.769 | 5.517 | | 1 |
| 9 | −85.014 | 2.041 | 27.50 | 1.75520 |
| 10 | −23.328 | 0.850 | 47.10 | 1.62374 |
| 11 | 28.488 | 12.090 | | 1 |
| 12 | 58.660 | 0.850 | 53.30 | 1.58904 |
| 13 | 17.971 | 2.721 | 62.90 | 1.54771 |
| 14 | −81.504 | | | | b.f = 39.24
Total Length: 89.974

Aberration Coefficients of Embodiment Example 1

| NO. | L | T | SA | CM | AS | PT | DS |
|---|---|---|---|---|---|---|---|
| 1 | 0.010886 | −0.010492 | 2.275149 | −2.192817 | 2.113464 | 0.721385 | −2.732263 |
| 2 | 0.008677 | −0.017028 | 2.622363 | −5.145930 | 10.097992 | 0.167612 | −20.144455 |
| 3 | 0.006755 | −0.004333 | −0.239447 | 0.153596 | −0.098526 | 0.946550 | −0.543974 |
| 4 | 0.014006 | −0.023720 | 15.384047 | −26.053558 | 44.122849 | 0.155080 | −74.986603 |
| 5 | −0.046099 | 0.077189 | −19.255997 | 32.242493 | −53.987274 | −0.273028 | 90.854187 |
| 6 | 0.007354 | −0.025897 | 0.211266 | −0.743993 | 2.620033 | −0.582505 | −7.175330 |
| 7 | 0.010171 | −0.003673 | −0.379612 | 0.137100 | −0.049515 | 2.334820 | −0.825358 |
| 8 | −0.010837 | 0.004010 | −0.014161 | 0.005240 | −0.001939 | −2.692418 | 0.996928 |
| 9 | −0.021356 | 0.038936 | −2.713195 | 4.946620 | −9.018538 | −0.506110 | 17.365067 |
| 10 | 0.022480 | −0.028426 | 1.677346 | −2.120966 | 2.681911 | 0.197728 | −3.641237 |
| 11 | −0.005689 | −0.005858 | −0.081137 | −0.083551 | −0.086038 | −1.348387 | −1.477116 |
| 12 | 0.001001 | 0.008560 | −0.002888 | 0.024699 | −0.211255 | 0.631920 | 3.597970 |
| 13 | −0.001984 | −0.001558 | −0.065029 | −0.051045 | −0.040067 | −0.093509 | −0.104851 |
| 14 | 0.004027 | −0.006926 | 0.596546 | −1.026105 | 1.764978 | 0.434187 | −3.782731 |
| 1-14 | −0.000607 | 0.000784 | 0.015255 | 0.042390 | −0.091932 | 0.093325 | −2.599766 |

L: Coefficient of chromatic aberration on the axis
T: Coefficient of magnification chromatic aberration
SA: Coefficient of spherical aberration
CM: Coefficient of comatic aberration
AS: Coefficient of astigmatism
PT: Petzval's sum
DS: Coefficient of distortion aberration

EMBODIMENT EXAMPLE 2

Focal Length f = 100    F number = 1:2.8
Image Angle 2ω = 8.24°

| | r | d | νd | nd |
|---|---|---|---|---|
| 1 | 47.975 | 5.109 | 81.60 | 1.49700 |
| 2 | −578.939 | 0.170 | | 1. |
| 3 | 36.441 | 6.471 | 81.60 | 1.49700 |
| 4 | −131.121 | 1.052 | | 1. |
| 5 | −114.319 | 1.703 | 32.10 | 1.67270 |
| 6 | 102.753 | 10.320 | | 1. |
| 7 | 17.114 | 2.043 | 61.10 | 1.58913 |
| 8 | 14.526 | 5.524 | | 1. |
| 9 | −89.834 | 2.043 | 27.50 | 1.75520 |
| 10 | −28.832 | 0.851 | 45.60 | 1.54869 |
| 11 | 24.817 | 13.637 | | 1. |
| 12 | 54.096 | 1.703 | 60.30 | 1.51835 |
| 13 | −132.637 | | | | b.f = 39.60
Total Length: 90.226

EMBODIMENT EXAMPLE 3

Focal Length f = 100    F number = 1:2.8
Image Angle 2ω = 8.24°

| | r | d | νd | nd |
|---|---|---|---|---|
| 1 | 55.949 | 8.000 | 81.60 | 1.49700 |
| 2 | −53.319 | 1.920 | | 1. |
| 3 | −48.599 | 1.666 | 37.80 | 1.77551 |
| 4 | −384.929 | 0.333 | | 1. |
| 5 | 34.351 | 5.333 | 81.60 | 1.49700 |
| 6 | 808.551 | 11.182 | | 1. |
| 7 | 15.225 | 1.931 | 61.10 | 1.58913 |
| 8 | 12.986 | 5.555 | | 1. |
| 9 | 127.952 | 1.666 | 27.50 | 1.75520 |
| 10 | −64.236 | 0.666 | 41.90 | 1.66755 |
| 11 | 25.975 | 8.322 | | 1. |
| 12 | 108.111 | 1.333 | 41.10 | 1.70154 |
| 13 | −823.619 | | | | b.f = 42.21
Total Length: 90.117

EMBODIMENT EXAMPLE 4

Focal Length f = 100   F number = 1:2.8
Image Angle 2ω = 8.24°

|    | r        | d      | νd    | nd      |
|----|----------|--------|-------|---------|
| 1  | 42.819   | 6.123  | 81.60 | 1.49700 |
| 2  | −165.112 | 0.170  |       | 1.      |
| 3  | 35.799   | 5.783  | 95.10 | 1.43387 |
| 4  | −163.269 | 0.980  |       | 1.      |
| 5  | −119.601 | 1.700  | 34.60 | 1.72047 |
| 6  | 89.689   | 10.915 |       | 1.      |
| 7  | 15.878   | 2.041  | 61.10 | 1.58913 |
| 8  | 13.799   | 5.532  |       | 1.      |
| 9  | −71.830  | 2.041  | 25.40 | 1.80518 |
| 10 | −24.673  | 0.850  | 43.80 | 1.61340 |
| 11 | 28.817   | 11.588 |       | 1.      |
| 12 | 60.563   | 0.850  | 55.50 | 1.69680 |
| 13 | 19.768   | 2.721  | 63.40 | 1.61800 |
| 14 | −90.954  |        |       |         | b.f = 38.595
Total Length: 89.894
θ5 1.3229
θ6 1.2626
θ7 1.2385
θ8 1.2401

EMBODIMENT EXAMPLE 5

Focal Length f = 100   F number = 1:2.8
Image Angle 2ω = 6.18°

|    | r        | d     | νd   | nd      |
|----|----------|-------|------|---------|
| 1  | 43.787   | 5.84  | 81.6 | 1.497   |
| 2  | −169.35  | 0.13  |      | 1.      |
| 3  | 37.296   | 5.58  | 81.6 | 1.497   |
| 4  | −155.24  | 0.97  |      | 1.      |
| 5  | −115.68  | 1.63  | 34.6 | 1.72047 |
| 6  | 74.556   | 10.99 |      | 1.      |
| 7  | 15.672   | 2.13  | 61.1 | 1.58913 |
| 8  | 13.767   | 6.27  |      | 1.      |
| 9  | −77.692  | 2.01  | 27.5 | 1.7552  |
| 10 | −21.975  | 0.88  | 43.8 | 1.6134  |
| 11 | 28.891   | 9.59  |      | 1.      |
| 12 | 56.621   | 0.75  | 49.6 | 1.7725  |
| 13 | 19.999   | 2.33  | 55.  | 1.6175  |
| 14 | −81.517  |       |      | 1.      | b.f = 38.55
Total Length: 87.65
θ5 1.3156
θ6 1.2626
θ7 1.2502
θ8 1.2480

EMBODIMENT EXAMPLE 6

Focal Length f = 100   F number = 1:2.8
Image Angle 2ω = 6.18°

|    | r        | d     | νd    | nd      |
|----|----------|-------|-------|---------|
| 1  | 44.980   | 5.39  | 81.60 | 1.49700 |
| 2  | −166.553 | 0.13  |       | 1.      |
| 3  | 37.715   | 5.56  | 81.60 | 1.49700 |
| 4  | −155.611 | 1.04  |       | 1.      |
| 5  | −115.267 | 1.63  | 34.70 | 1.72047 |
| 6  | 78.877   | 12.24 |       | 1.      |
| 7  | 15.977   | 2.13  | 61.00 | 1.58913 |
| 8  | 13.989   | 6.65  |       | 1.      |
| 9  | −80.934  | 2.01  | 25.70 | 1.78472 |
| 10 | −20.879  | 0.88  | 39.70 | 1.65412 |
| 11 | 26.949   | 9.83  |       | 1.      |
| 12 | 55.810   | 0.75  | 54.70 | 1.72916 |
| 13 | 20.592   | 2.27  | 58.70 | 1.61272 |

-continued

Focal Length f = 100   F number = 1:2.8
Image Angle 2ω = 6.18°

|    | r       | d | νd | nd |
|----|---------|---|----|----|
| 14 | −70.248 |   |    |    | b.f = 37.33
Total Length: 87.82
θ5 1.3275
θ6 1.2726
θ7 1.2407
θ8 1.2415

EMBODIMENT EXAMPLE 7

Focal Length f = 100   F number = 1:2.8
Image Angle 2ω = 8.24°

|    | r        | d    | νd    | nd      |
|----|----------|------|-------|---------|
| 1  | 44.710   | 5.79 | 95.10 | 1.43387 |
| 2  | −157.835 | 0.24 |       | 1.      |
| 3  | 37.266   | 5.77 | 81.60 | 1.49700 |
| 4  | −156.600 | 1.17 |       | 1.      |
| 5  | −116.909 | 1.89 | 34.70 | 1.72047 |
| 6  | 89.317   | 9.89 |       | 1.      |
| 7  | 16.001   | 2.08 | 61.00 | 1.58913 |
| 8  | 14.231   | 6.53 |       | 1.      |
| 9  | −73.909  | 1.74 | 25.40 | 1.80518 |
| 10 | −25.100  | 0.85 | 43.80 | 1.61340 |
| 11 | 29.334   | 7.03 |       | 1.      |
| 12 | 99.290   | 0.85 | 60.10 | 1.64000 |
| 13 | 15.689   | 2.98 | 63.40 | 1.61800 |
| 14 | −69.680  |      |       |         | b.f = 42.96
Total Length: 89.76
θ5 1.3229
θ6 1.2626
θ7 1.2296
θ8 1.2401

What is claimed is:

1. A tele-photographic lens of a large aperture ratio comprising:
    a fixed first lens group which has a positive refracting power;
    a fixed second lens group which has a negative refracting power and is disposed on the image side of said first lens group;
    a third lens group which has a negative refracting power and is disposed on the image side of said second lens group, said third lens group being arranged to be movable in the direction of the optical axis of the lens for focusing it on an object to be photographed; and
    a fixed fourth lens group which has a positive refracting power and is disposed on the image side of said third lens group;
    wherein, when said tele-photographic lens is focused on an object located at infinity, the compound focal length of the first, second and third lens groups is f(I,II,III) and the focal length of the whole lens system is fT, said tele-photographic lens is arranged to satisfy the following condition:

$$2\,fT < f(I, II, III) < 2.6\,fT$$

2. A tele-photographic lens according to claim 1, wherein said first lens group is composed of two positive lenses and one negative lens; said second lens group is composed of a meniscus lens having its convex face directed to an object to be photographed; said third lens group is a doublet lens composed by cementing together a positive lens and a negative lens; and, designating the radius of curvature of a lens surface located at an i-th position in the whole system as ri, the center thickness or the spatial interval of the i-th lens of the whole system as di, the refractive index of the i-th lens of the whole system as ni and the focal length of the positive third lens group as fIII, said tele-photographic lens is arranged to satisfy the following conditions:

$0.35\, fT < |fIII| < 0.58\, fT$ and $fIII < 0$ $0.125\, fT < r8 < 0.15\, fT$ $0.24\, fT < r11 < 0.3\, fT$ $0.1/fT < (n6-n5)/r10 < 1/fT$ 3. A tele-photographic lens according to claim 2 wherein, designating the Abbe number of the positive lens of said third lens group as $\nu5$, the partial dispersion ratio thereof as $\theta5$, the Abbe number of the negative lens of said third lens group as $\nu6$ and the partial dispersion ratio thereof as $\theta6$, said tele-photographic lens satisfies the following condition:

$-0.004 < (\theta6-\theta5)/(\nu6-\nu5) < 0.003$

4. A tele-photographic lens according to claim 2, wherein said first lens group corresponds to r1–r6, said second lens group to r7 and r8, said third lens group to r9–r11 and said fourth lens group to r12–r14; and designating r as the radius of curvature, nd as the refractive index of the line d, d as the center thickness of the lens of a spatial interval and $\nu d$ as the Abbe number of the line d and said lens, having a focal length f=100, a F number=1:2.8 and an image angle $2\omega=8.24°$, satisfies the following conditions:

| | r | d | νd | nd |
|---|---|---|---|---|
| 1 | 46.022 | 5.613 | 81.60 | 1.49700 |
| 2 | −198.074 | 0.170 | | 1. |
| 3 | 35.074 | 5.783 | 81.60 | 1.49700 |
| 4 | −214.081 | 1.051 | | 1. |
| 5 | −147.297 | 1.700 | 32.10 | 1.67270 |
| 6 | 69.040 | 10.307 | | 1. |
| 7 | 15.878 | 2.041 | 61.10 | 1.58913 |
| 8 | 13.769 | 5.517 | | 1. |
| 9 | −85.014 | 2.041 | 27.50 | 1.75520 |
| 10 | −23.328 | 0.850 | 47.10 | 1.62374 |
| 11 | 28.488 | 12.090 | | 1. |
| 12 | 58.660 | 0.850 | 53.30 | 1.58904 |
| 13 | 17.971 | 2.721 | 62.90 | 1.54771 |
| 14 | −81.504 | | | | b.f = 39.24

5. A tele-photographic lens according to claim 2, wherein said first lens group corresponds to r1–r6, said second lens group to r7 and r8, said third lens group to r9–r11 and said fourth lens group to r12 and r13; and designating r as the radius of curvature, d as the lens thickness on the axis or a spatial interval, nd as the refractive index of the line d and $\nu d$ as the Abbe number of the line d and said lens, having a focal length f=100, a F number=1:2.8 and an image angle $2\omega=8.24°$, satisfies the following conditions:

| | r | d | νd | nd |
|---|---|---|---|---|
| 1 | 47.975 | 5.109 | 81.60 | 1.49700 |
| 2 | −578.939 | 0.170 | | 1. |
| 3 | 36.441 | 6.471 | 81.60 | 1.49700 |
| 4 | −131.121 | 1.052 | | 1. |
| 5 | −114.319 | 1.703 | 32.10 | 1.67270 |

-continued

| | r | d | νd | nd |
|---|---|---|---|---|
| 6 | 102.753 | 10.320 | | 1. |
| 7 | 17.114 | 2.043 | 61.10 | 1.58913 |
| 8 | 14.526 | 5.524 | | 1. |
| 9 | −89.834 | 2.043 | 27.50 | 1.75520 |
| 10 | −28.832 | 0.851 | 45.60 | 1.54869 |
| 11 | 24.817 | 13.637 | | 1. |
| 12 | 54.096 | 1.703 | 60.30 | 1.51835 |
| 13 | −132.637 | | | | b.f = 39.60

6. A tele-photographic lens according to claim 2, wherein said first lens group corresponds to r1–r6, said second lens group to r7 and r8, said third lens group to r9–r11 and said fourth lens group to r12 and r13; and designating r as the radius of curvature, d as the lens thickness on the axis or a spatial interval, nd as the refractive index of the line d and $\nu d$ as the Abbe number of the line d and said lens, having a focal length f=100, a F number=1:2.8 and an image angle $2\omega=8.24°$, satisfies the following conditions:

| | r | d | νd | nd |
|---|---|---|---|---|
| 1 | 55.949 | 8.000 | 81.60 | 1.49700 |
| 2 | −53.319 | 1.920 | | 1. |
| 3 | −48.599 | 1.666 | 37.80 | 1.77551 |
| 4 | −384.929 | 0.333 | | 1. |
| 5 | 34.351 | 5.333 | 81.60 | 1.49700 |
| 6 | 808.551 | 11.182 | | 1. |
| 7 | 15.225 | 1.931 | 61.10 | 1.58913 |
| 8 | 12.986 | 5.555 | | 1. |
| 9 | 127.952 | 1.666 | 27.50 | 1.75520 |
| 10 | −64.236 | 0.666 | 41.90 | 1.66755 |
| 11 | 25.975 | 8.322 | | 1. |
| 12 | 108.111 | 1.333 | 41.10 | 1.70154 |
| 13 | −823.619 | | | | b.f = 42.21

7. A tele-photographic lens according to claim 1, wherein:
said first lens group includes positive and negative lenses;
the front lens surface of said second lens group is a convex face directed to an object to be photographed while the rear lens surface of said second lens group is a concave face directed to an image;
said third lens group includes positive and negative lenses;
said fourth lens group is a doublet lens formed by cementing negative and positive lenses together; and
designating the Abbe number of the negative lens of the fourth lens group as $\nu7$, the partial dispersion ratio thereof as $\theta7$, the Abbe number of the positive lens of the fourth lens group as $\nu8$ and the partial dispersion ratio thereof as $\theta8$, said fourth lens group satisfies the following condition:

$-0.0005 < (\theta8-\theta7)/(\nu8-\nu7) < +0.0035$

8. A tele-photographic lens according to claim 7, wherein said first lens group corresponds to r1–r6, said second lens group to r7 and r8, said third lens group to r9–r11 and said fourth lens group to r12–r14; and designating r as the radius of curvature, d as the lens thickness on the axis or a spatial interval, nd as the refractive index of the line d and $\nu d$ as the Abbe number of the line d and said lens, having a focal length f=100, a F number=1:2.8 and an image angle 2ω=8.24°, satisfies the following conditions:

| | r | d | vd | nd |
|---|---|---|---|---|
| 1 | 42.819 | 6.123 | 81.60 | 1.49700 |
| 2 | −165.112 | 0.170 | | 1. |
| 3 | 35.799 | 5.783 | 95.10 | 1.43387 |
| 4 | −163.269 | 0.980 | | 1. |
| 5 | −119.601 | 1.700 | 34.60 | 1.72047 |
| 6 | 89.689 | 10.915 | | 1. |
| 7 | 15.878 | 2.041 | 61.10 | 1.58913 |
| 8 | 13.799 | 5.532 | | 1. |
| 9 | −71.830 | 2.041 | 25.40 | 1.80518 |
| 10 | −24.673 | 0.850 | 43.80 | 1.61340 |
| 11 | 28.817 | 11.588 | | 1. |
| 12 | 60.563 | 0.850 | 55.50 | 1.69680 |
| 13 | 19.768 | 2.721 | 63.40 | 1.61800 |
| 14 | −90.954 | | | | b.f = 38.595

9. A tele-photographic lens according to claim 7, wherein said first lens group corresponds to r1–r6, said second lens group to r7 and r8, said third lens group to r9–r11 and said fourth lens group to r12–r14; and designating r as the radius of curvature, d as the lens thickness on the axis or a spatial interval, nd as the refractive index of the line d and vd as the Abbe number of the line d and said lens, having a focal length f=100, a F number=1:2.8 and an image angle 2ω=6.18°, satisfies the following conditions:

| | r | d | vd | nd |
|---|---|---|---|---|
| 1 | 43.787 | 5.84 | 81.6 | 1.497 |
| 2 | −169.35 | 0.13 | | 1. |
| 3 | 37.296 | 5.58 | 81.6 | 1.497 |
| 4 | −155.24 | 0.97 | | 1. |
| 5 | −115.08 | 1.63 | 34.6 | 1.72047 |
| 6 | 74.556 | 10.99 | | 1. |
| 7 | 15.672 | 2.13 | 61.1 | 1.58913 |
| 8 | 13.767 | 6.27 | | 1. |
| 9 | −77.692 | 2.01 | 27.5 | 1.7552 |
| 10 | −21.975 | 0.88 | 43.8 | 1.6134 |
| 11 | 28.891 | 9.59 | | 1. |
| 12 | 56.621 | 0.75 | 49.6 | 1.7725 |
| 13 | 19.999 | 2.33 | 55. | 1.6175 |
| 14 | −81.517 | | | 1. | b.f = 38.55

10. A tele-photographic lens according to claim 7, wherein said first lens group corresponds to r1–r6, said second lens group to r7 and r8, said third lens group to r9–r11 and said fourth lens group to r12–r14; and designating r as radius of curvature, d as the lens thickness on the axis or a spatial interval, nd as the refractive index of the line d and vd as the Abbe number of the line d and said lens, having a focal length f=100, a F number=1:2.8 and an image angle 2ω=8.24°, satisfies the following conditions:

| | r | d | vd | nd |
|---|---|---|---|---|
| 1 | 44.980 | 5.39 | 81.60 | 1.49700 |
| 2 | −166.553 | 0.13 | | 1. |
| 3 | 37.715 | 5.56 | 81.60 | 1.49700 |
| 4 | −155.611 | 1.04 | | 1. |
| 5 | −115.267 | 1.63 | 34.70 | 1.72047 |
| 6 | 78.877 | 12.24 | | 1. |
| 7 | 15.977 | 2.13 | 61.00 | 1.58913 |
| 8 | 13.989 | 6.65 | | 1. |
| 9 | −80.934 | 2.01 | 25.70 | 1.78472 |
| 10 | −20.879 | 0.88 | 39.70 | 1.65412 |
| 11 | 26.949 | 9.83 | | 1. |
| 12 | 55.810 | 0.75 | 54.70 | 1.72916 |
| 13 | 20.592 | 2.27 | 58.70 | 1.61272 |
| 14 | −70.248 | | | | b.f = 37.33

11. A tele-photographic lens according to claim 7, wherein said first lens group corresponds to r1–r6, said second lens group to r7 and r8, said third lens group to r9–r11 and said fourth lens group to r12–r14; and designating r as the radius of curvature, d as the lens thickness on the axis or a spatial interval, nd as the refractive index of the line d and vd as the Abbe number of the line d and said lens, having a focal length f=100, a F number=1:2.8 and an image angle 2ω=8.24°, satisfies the following conditions:

| | r | d | vd | nd |
|---|---|---|---|---|
| 1 | 44.980 | 5.39 | 81.60 | 1.49700 |
| 2 | −166.553 | 0.13 | | 1. |
| 3 | 37.715 | 5.56 | 81.60 | 1.49700 |
| 4 | −155.611 | 1.04 | | 1. |
| 5 | −115.267 | 1.63 | 34.70 | 1.72047 |
| 6 | 78.877 | 12.24 | | 1. |
| 7 | 15.977 | 2.13 | 61.00 | 1.58913 |
| 8 | 13.989 | 6.65 | | 1. |
| 9 | −80.934 | 2.01 | 25.70 | 1.78472 |
| 10 | −20.879 | 0.88 | 39.70 | 1.65412 |
| 11 | 26.949 | 9.83 | | 1. |
| 12 | 55.810 | 0.75 | 54.70 | 1.72916 |
| 13 | 20.592 | 2.27 | 58.70 | 1.61272 |
| 14 | −70.248 | | | | b.f = 37.33

* * * * *